United States Patent
Ding et al.

(10) Patent No.: US 12,248,530 B2
(45) Date of Patent: Mar. 11, 2025

(54) OPTIMIZED PARTIAL AND DELTA PROCESSING SYSTEM

(71) Applicant: SAP SE, Walldorf (DE)

(72) Inventors: Yaopeng Ding, Shanghai (CN); Senyun Yao, Shanghai (CN); Thorsten Peter Petri, Plankstadt (DE); Xiaoxia Shen, Shanghai (CN); Thomas Brodkorb, Wiesloch (DE)

(73) Assignee: SAP SE, Walldorf (DE)

( * ) Notice: Subject to any disclaimer, the term of this patent is extended or adjusted under 35 U.S.C. 154(b) by 30 days.

(21) Appl. No.: 18/136,163

(22) Filed: Apr. 18, 2023

(65) Prior Publication Data

US 2024/0354357 A1    Oct. 24, 2024

(51) Int. Cl.
*G06F 16/957* (2019.01)
*G06F 16/22* (2019.01)
*G06F 40/177* (2020.01)

(52) U.S. Cl.
CPC ........ *G06F 16/9577* (2019.01); *G06F 16/221* (2019.01); *G06F 40/177* (2020.01)

(58) Field of Classification Search
CPC ............... G06F 16/9577; G06F 16/221; G06F 40/177
See application file for complete search history.

(56) References Cited

U.S. PATENT DOCUMENTS

| | | | |
|---|---|---|---|
| 2009/0228434 A1* | 9/2009 | Krishnamurthy | G06F 16/24532 |
| 2014/0344520 A1* | 11/2014 | Jenkins | G06F 16/9574 711/118 |
| 2020/0089747 A1* | 3/2020 | Hofer | G06F 40/177 |
| 2021/0365630 A1* | 11/2021 | Itani | G06F 3/0482 |

* cited by examiner

*Primary Examiner* — Kris E Mackes
*Assistant Examiner* — Lin Lin M Htay
(74) *Attorney, Agent, or Firm* — SCHWEGMAN LUNDBERG & WOESSNER, P.A.

(57) ABSTRACT

Systems and methods are provided for receiving an updated data set from a backend server system, determining a visible set of data in a user interface displayed on a computing device, and processing, based on the updated data set from the backend server system, each row tuple in the visible set of data in the user interface to generate updated row tuples. The systems and methods further provide for determining one or more data cell that has been changed in the visible set of data corresponding to the updated row tuples, and rendering, in the user interface, only the one or more data cell that has been changed corresponding to the one or more row tuple to update the one or more data cell in the user interface displayed on the computing device.

20 Claims, 8 Drawing Sheets

≡ ∨ | 🏠 Stories | Fluid Data Entry ∨ ☆ ⊗

File∨ Edit∨ Tools∨ Display∨ | Publish Data ∨ | 🖶 ⇕∨ | ▽ ⟳ 🖫 ∨ | Page 1 ∨ ‹1/1› | ✕ ⊘

Company_Expanded
in $ Million | ✻ | 1 Filter | 5 ⚠

| G/L Account | Version Time >2020 | Actual >2020 | Forecast* >2020 | Jan (2020) | Feb (2020) | Mar (2020) | Apr (2020) | May (2020) |
|---|---|---|---|---|---|---|---|---|
| Sales Revenue ∨ All Products | | 595.74 | 26,796,030.23 | 420.27 | 2,360.84 | 26,763,301.04 | 9,141.05 | 8,576.68 |
| Unassigned | | - | 472.00 | 9.00 | 95.00 | 95.00 | 95.00 | 86.00 |
| ∨ Cruise | | 219.72 | 26,790,364.84 | 252.16 | 965.00 | 26,762,150.70 | 7,985.00 | 8,209.29 |
| C900 Bike | | 36.62 | 190.14 | 8.94 | 7.00 | 11.00 | 9.00 | 9.00 |
| C950 Bike | | 36.62 | 4,475,879.14 | 99.00 | 777.00 | 4,466,807.29 | 7,780.00 | 144.86 |
| eBike E101 | | 36.62 | 4,459,111.23 | 8.00 | 7.00 | 4,459,037.29 | 10.00 | 9.00 |
| eBike E102 | | 36.62 | 4,477,007.60 | 10.58 | 88.00 | 4,459,118.29 | 91.00 | 7,822.86 |
| eBike E103 | | 36.62 | 4,459,352.63 | 125.64 | 9.00 | 4,459,039.29 | 12.00 | 54.86 |
| C990 Bike | | 36.62 | 4,459,652.96 | - | 77.00 | 4,459,107.29 | 80.00 | 122.86 |
| Cruise Total | | 219.72 | 22,331,193.69 | 252.16 | 965.00 | 22,303,120.43 | 7,982.00 | 8,163.43 |
| eBike 1000 | | - | 4,459,171.14 | - | - | 4,459,030.29 | 3.00 | 45.86 |
| ∨ Mountain | | 162.53 | 3,439.45 | 70.15 | 888.00 | 888.00 | 888.00 | 134.13 |
| M500 Bike | | 54.18 | 158.20 | 22.57 | - | - | - | 7.00 |
| M525 Bike | | 54.18 | 3,086.63 | 25.00 | 888.00 | 888.00 | 888.00 | 99.00 |
| M550 Bike | | 54.18 | 194.62 | 22.57 | - | - | - | 28.13 |
| ∨ Racing | | 86.53 | 569.86 | 36.06 | 115.46 | 35.73 | 42.82 | 46.06 |
| R100 Bike | | 28.84 | 115.28 | 12.02 | 7.00 | 11.91 | 7.00 | 7.00 |
| R200 Bike | | 28.84 | 274.88 | 12.02 | 54.23 | 11.91 | 25.00 | 25.00 |

FIG. 4A

| | Jun (2020) | Jul (2020) | Aug (2020) | Sep (2020) | Oct (2020) | Nov (2020) | Dec (2020) |
|---|---|---|---|---|---|---|---|
| | 9,578.13 | 1,527.36 | 297.52 | 213.92 | 163.25 | 231.95 | 218.23 |
| | 78.00 | 14.00 | - | - | - | - | - |
| | 9,251.29 | 1,260.12 | 97.24 | 18.01 | 9.00 | 87.02 | 79.99 |
| | 9.00 | 45.86 | 77.81 | - | - | 6.26 | 6.26 |
| | 144.86 | 125.84 | 0.29 | 0.01 | - | +0.00 | 0.01 |
| | 9.00 | 9.00 | 9.00 | 9.00 | - | 1.97 | 1.97 |
| | 8,933.86 | 933.86 | 0.29 | - | - | 6.90 | 1.97 |
| | 54.86 | 45.86 | 0.29 | - | - | 4.93 | 5.92 |
| | 53.86 | 53.86 | 9.29 | 9.00 | 9.00 | 66.95 | 63.86 |
| | 9,205.43 | 1,214.26 | 96.95 | 18.01 | 9.00 | 87.02 | 79.99 |
| | 45.86 | 45.86 | 0.29 | - | - | - | - |
| | 132.62 | 136.67 | 64.00 | 62.01 | 53.49 | 62.64 | 59.75 |
| | 7.00 | 21.00 | 21.00 | 21.00 | 17.83 | 20.88 | 19.92 |
| | 99.00 | 99.00 | 21.50 | 20.51 | 17.83 | 20.88 | 19.92 |
| | 26.62 | 16.67 | 21.50 | 20.51 | 17.83 | 20.88 | 19.92 |
| | 45.31 | 44.55 | 47.89 | 46.84 | 43.98 | 33.55 | 31.81 |
| | 7.00 | 9.77 | 11.45 | 10.92 | 9.49 | 11.12 | 10.60 |
| | 25.00 | 25.00 | 25.00 | 25.00 | 25.00 | 11.12 | 10.60 |

FIG. 4B

OPTIMIZED PARTIAL AND DELTA PROCESSING SYSTEM

BACKGROUND

A data structure such as a table can be used to organize information, perform calculations on information, and make updates to information. For example, a user of a computing device may be working on a table comprising thousands of products to generate analytics about revenue, forecasting, and the like, related to the products. Due to the large amount of shared data for the product information, the data resides on a backend system and is processed by the backend system. Storing, updating, and processing information by a backend system based on changes made on a computing device can use significant computing resources and take significant time to complete and provide results to the computing device. This is especially an issue with such large data sets of information and for more complex calculations and analytics.

BRIEF DESCRIPTION OF THE DRAWINGS

Various ones of the appended drawings merely illustrate example embodiments of the present disclosure and should not be considered as limiting its scope.

FIG. 4A and FIG. 4B illustrate an example user interface, according to some example embodiments.

DETAILED DESCRIPTION

Figure 1:
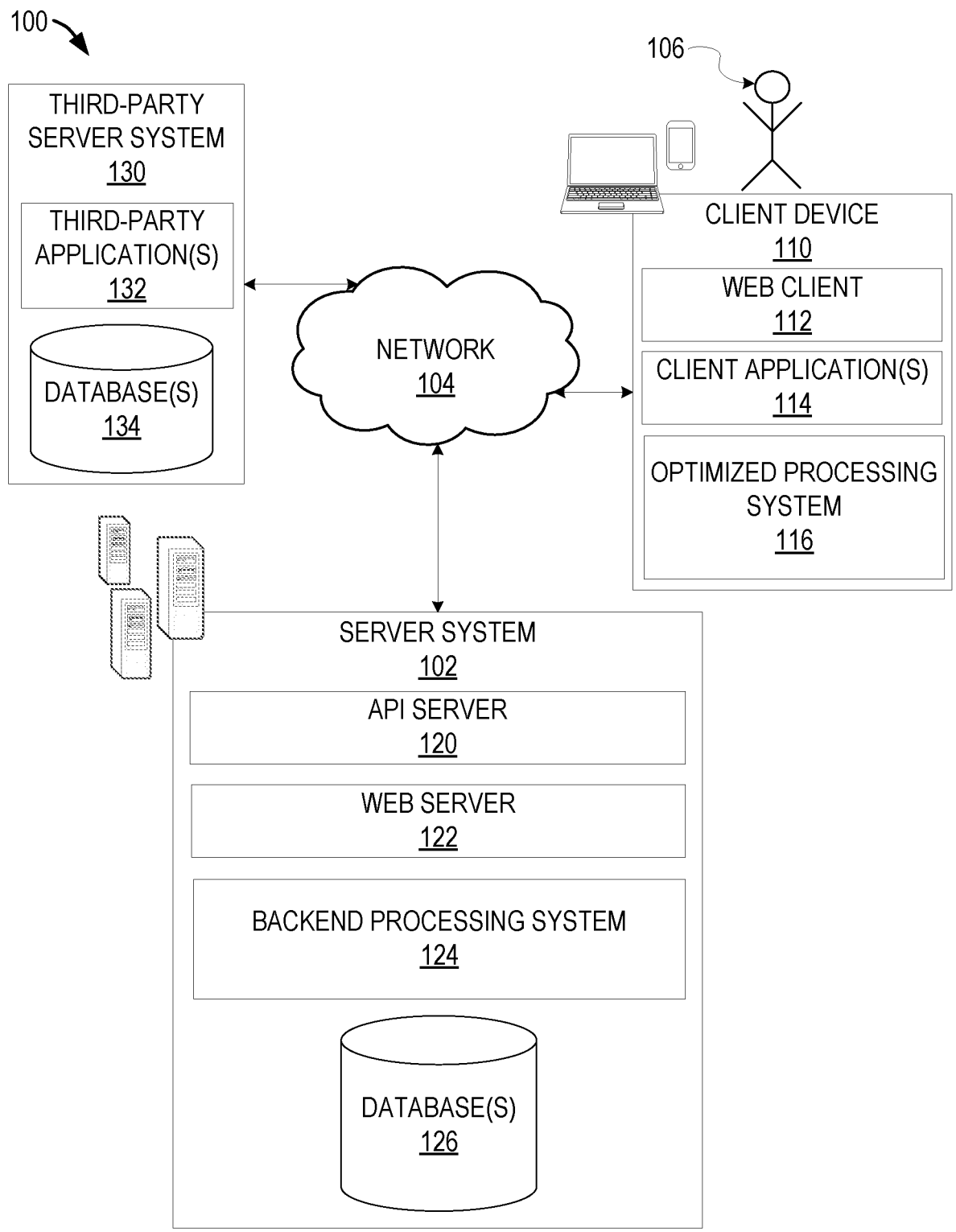
FIG. 1 is a block diagram illustrating a networked system, according to some example embodiments.

Systems and methods described herein relate to an optimized processing system for managing changes to information on a front-end computing device that need to be processed on a backend server system. For example, large amounts of data cannot be stored on a front-end only system and more complex calculations cannot be done on a front-end only spreadsheet-type application. Accordingly, the large amounts of data are stored on a backend server system, such as a cloud services system, where more complex and processing intensive calculations can be done with the large amounts of data.

In conventional systems that comprise a front-end user interface access to data on a backend system, (for example, via a web browser user interface), each time a change is made to a value of a cell in a table displaying the data, no other values can be changed or added to the cell or other cells until the changed value is sent to the backend server system, the changed data is processed, and the backend server system sends back an updated data set for all of the data in the table. Instead, the table is locked for further input until the updated data set is received from the backend system and the front-end computing device updates the data in the table displayed in the user interface. Because of restrictions for accessing data in a backend system (such as a cloud system) and the limited resources in terms of processing power and memory of a web browser and computing device, it can take some seconds to even minutes that a user has to wait before the user can do anything further with the table. This creates a very slow and inefficient system.

Embodiments described herein provide for an optimized system that caches and batches changes made to data in a table on the front-end system. The optimized system calculates a predefined time interval, evaluates the interval between input to the table (e.g., new or changed value in a cell in the table) and a status of processing a previous batch of changes, and submits the changes to the backend system at the end of the predefined interval. Further, partial processing of a visible set of data in a user interface and delta processing and rendering of only changes to the affected cells that are in the visible set of data are provided to further improve performance by ensuring only changed cells are updated in a visible area of the table in the user interface on the front-end system. This greatly improves performance, especially when the table is very large and/or has a complex hierarchy.

The embodiments described herein provide for significantly improved performance and minimize resources so that all updates to the table based on changes made in the table occur silently with no user interface blocking, no programming blocking, and no HTTP request blocking. Instead, all complex logic including HTTP requests are done in an asynchronous way and all action dependencies are correctly managed. A user can continue to enter and change data in the table as the changes are submitted to and processed by the backend system, without having to wait for backend processing every time a value is input or changed.

In one example embodiment, a computing device utilizing an optimized processing system, detects input in a data cell on a user interface displayed on the computing device and caches a value of the input in memory. The computing device determines that a predefined period of time has passed since one or more values cached in the memory have been sent to a backend server system to be processed and sends the value and any other values cached in the memory to the backend server system to be processed. The computing device removes the value and any other values cached in the memory. When the computing device receives an updated data set from the backend server system, the computing device determines a visible set of data in the user interface and processes, based on the updated data set from the backend server system, each row tuple in the visible set of data in the user interface to generate updated row tuples. The computing device determines one or more data cell that has been changed in the visible set of data corresponding to the updated row tuples, and renders, in the user interface, only the one or more data cell that has been changed corresponding to updated row tuples to update the one or more data cell in the user interface displayed on the computing device.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, wearable computing device, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, utilize a backend processing system 124, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an application for pushing a commit to update code in a project, an application for accessing and utilizing a backend processing system 124, and the like. In one example, the web client 112 utilizes an optimized processing system 116 and/or one or more client application(s) 114 utilize the optimized processing system 116.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access a backend processing system 124, and so forth), and so forth. Conversely, one or more client applications 114 may not be included in the client device 110, and then the client device 110 may use its web browser to access the one or more applications hosted on other entities in the system 100 (e.g., third-party server system 130, server system 102).

The optimized processing system 116 (e.g., an optimized partial and delta processing system) is configured to display, in a user interface, representations of data stored via the backend processing system 124 (e.g., in one or more databases 126), receive input with new data or changes to data in the representations, send new data and changes to the backend processing system 124, receive an updated data set and process and render changed data to display updated representations of the data in the user interface. These features are explained in further detail below.

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and backend processing system 124 that may be communicatively coupled with one or more databases 126.

The one or more databases 126 may be storage devices that store data related to users of the system 100, applications associated with the system 100, cloud services, machine learning models, data related to entities/products/services, and so forth. The one or more databases 126 may further store information related to third-party server system 130, third-party applications 132, third-party database(s) 134, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The backend processing system 124 may provide backend support for third-party applications 132 and client applications 114, including the optimized processing system 116, which may include cloud-based applications. The backend processing system 124 may provide for updating and processing changes to data received by the optimized partial and delta processing system 116, the web client 112, or one or more client application(s) 114, as explained in further detail below. The backend processing system 124 may comprise one or more servers or other computing devices or systems.

The system 100 further includes one or more third-party server system 130. The one or more third-party server system 130 may include one or more third-party application(s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In another example, a third-party server system 130 is a system associated with an entity that accesses cloud services via server system 102.

The third-party database(s) 134 may be storage devices that store data related to users of the third-party server system 130, applications associated with the third-party server system 130, cloud services, machine learning models, parameters, and so forth. The one or more databases 126 may further store information related to third-party applications 132, client devices 110, client applications 114, users 106, and so forth. In one example, the one or more databases 134 are cloud-based storage.

Figure 2:
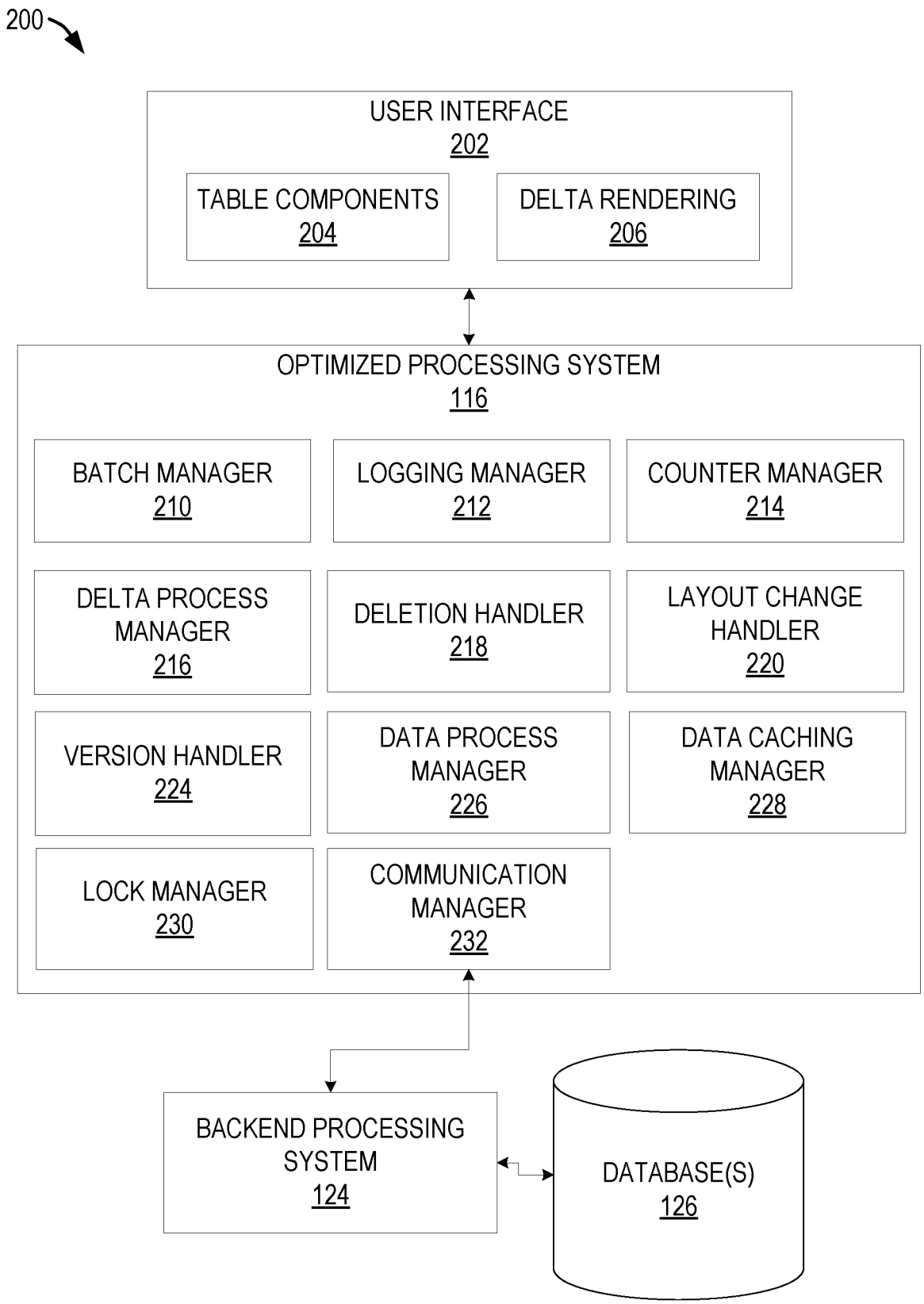
FIG. 2 is a block diagram illustrating further detail of the front-end client device 110, and in particular, the optimized processing system 116 and interaction with the backend processing system 124 and database(s) 126 shown in FIG. 1, according to some example embodiments.

FIG. 2 is a block diagram 200 showing further details of the front-end client device 110, and in particular, the optimized processing system 116 and interaction with the backend processing system 124 and database(s) 126. The optimized processing system 116 causes display of a user interface 202 that displays, on a computing device such as client device 110, representations of data stored in one or more database(s) 126 on a backend system, such as server system 102. In one example, the optimized processing system 116 causes display of the user interface 202 via a web client 112 or client application 114, as shown in FIG. 1. In one example, the user interface 202 comprises a table components 204 data structure that includes data to display in a table of the user interface 202 as representations of data stored in one or more databases 126 via a backend system (e.g., backend processing system 124, server system 102) and a delta rendering 206 component for rendering changes to the data to display in the user interface 202. The methods provided by these processes are described in further detail below.

The optimized processing system 116 is shown to comprise components 210-232. It is to be understood that more or less components can be utilized by the optimized processing system 116 and that some components could be combined into single a single component, in example embodiments.

The data caching manager 228 caches each input made-to-date in the user interface 202. The batch manager 210 is configured to batch the cached input made to the data in the user interface 202 and determine timing, based on a predefined time period, for sending batched changes to the backend processing system 124 to update data in the database(s) 126.

The logging manager 212 logs or records everything (e.g., every input/change) made in the user interface 202 and by the optimized processing system 116. This data recorded by the logging manager 212 can be used to troubleshoot any issues that arise in processing changes in data, among other things. The counter manager 214 keeps count of changes made to ensure all changes are made synchronously and completed.

The delta process manager 216 is configured to determine changes made to data, the deletion manager 218 handles deleted data, and the layout change manager 220 handles changes to a layout in the user interface 202 (e.g., new or deleted rows and columns). The version handler 224 manages different versions of a table or other representation of data.

The data process manager 226 processes data received from the backend processing system 124 and does further processing such as formatting or additional calculations needed for the representations of the data in the user interface 202. The lock manager 230 comprises a mechanism to lock certain data to be sure there is no data conflict. The communication manager 232 is responsible for communicating with the backend processing system 124, such as by handling HTTP requests, among other means of communications.

Figure 3:
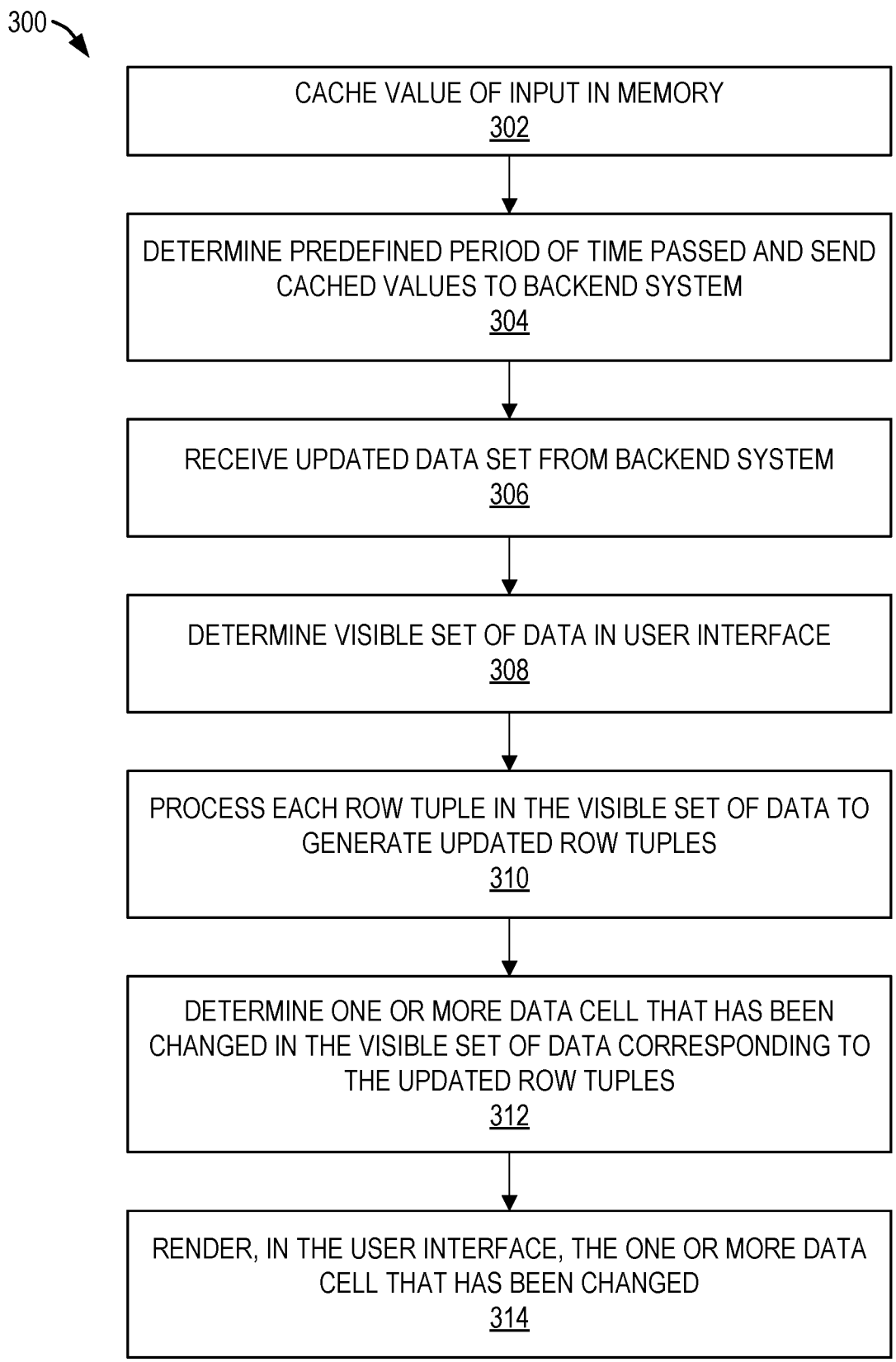
FIG. 3 comprises a flow chart illustrating aspects of a method, according to some example embodiments.

FIG. 3 is a flow chart illustrating aspects of a method 300 for optimized and delta processing, according to some example embodiments. For illustrative purposes, method 300 is described with respect to the block diagram of FIG. 1 and FIG. 2. It is to be understood that method 300 may be practiced with other system configurations in other embodiments.

In operation 302, a computing device (e.g., client device 110), caches a value of input in memory (e.g., stores a value of the input in a cache). For example, the computing device detects input in a data cell on a user interface displayed on the computing device and caches a value of that input in memory. FIG. 4A and FIG. 4B show a user interface 400, split into two pages for readability, with an example, in the form of a table 402 with multiple dimensions in rows and columns, of representations of data stored in one or more databases 126 on a backend system, such as server system 102. It is to be understood that a table is just one example of how the data can be represented in a user interface and that other ways to represent data in a user interface can be used in example embodiments described herein. The table 402 comprises numerous rows 404 and numerous columns 406. In this example, the columns 406 represent a list of products and sales revenue for months in the year 2020 and the rows represent data for all products as well as each specific individual product (e.g., C900 Bike) for each month in the year 2020. In the example user interface 400, only a portion of the data is visible in the user interface and a user can scroll down to see further data.

In one example, a user can make a change such as by entering a new value, deleting a value, or changing a value in the table. For instance, a user can change the forecast value 408 for the C900 Bike from 190.14 to 300. The computing device detects that the user is entering or has entered the value and caches that value in memory.

Returning to FIG. 3, in operation 304, the computing device determines that a predefined period of time has passed and sends values that have been cached in memory to a backend server system, such as backend processing system 124. For example, a predefined period can be set to one second and the computing device determines if one second has passed since any values cached in memory have been sent to the backend server system. Based on determining that the predefined period of time has passed since one or more values cached in the memory have been sent to a backend server system to be processed, the computing device sends the value input and any other values cached in the memory to the backend server system to be processed. The computing device then removes (e.g., deletes) from memory the value input and any other values cached in memory. In one example, the computing device displays an indication in a data cell for each value that has been sent to the backend server to be processed to indicate that it is being processed. For instance, the computing system could cause the data cell for each value to be highlighted in a certain color (e.g., yellow), cause the font of the value in the data cell to change in size, format, or color, or cause another indication.

Figure 5:
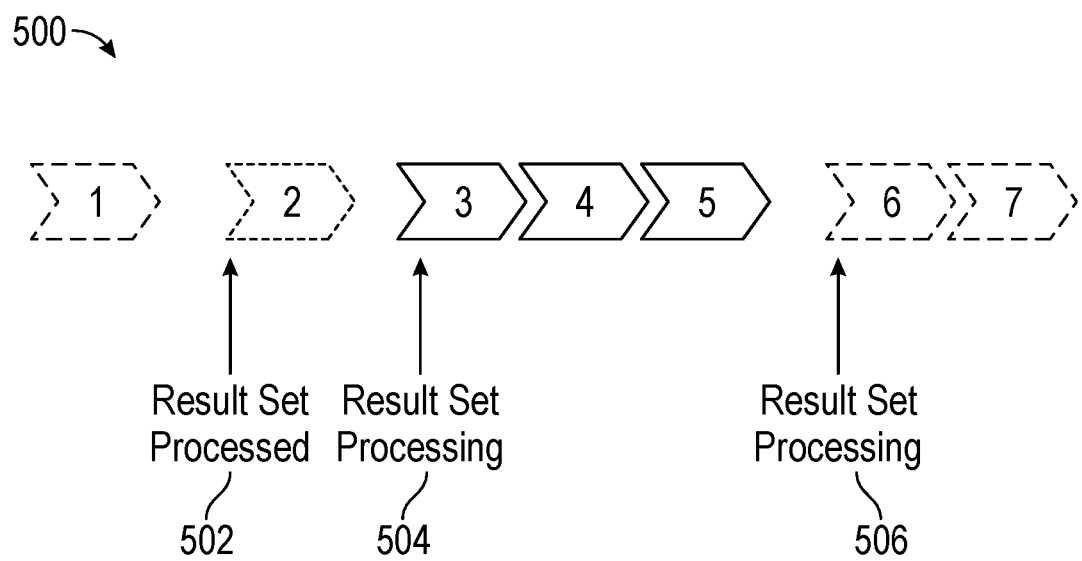
FIG. 5 illustrates an example of batching and sending values to a backend server system, according to some example embodiments.

FIG. 5 shows an example 500 of batching and sending values to the backend server system. In the example 500, a first input 1 is made (e.g., such as changing the forecast value 408 from 190.14 to 300) and cached to memory. At 502, the computing device determines that the predefined period of time has passed which triggers it to send the first input 1 to the backend server system to be processed and the first input 1 is removed from memory. The user then enters a second input 2 which is cached to memory. At 504, the computing device determines that the predefined period of time has passed and sends the second input 2 to the backend server system to be processed and the second input 2 is removed from memory. The user then enters inputs 3, 4, and 5 which are also cached to memory. At 506, the computing device determines that the predefined period of time has passed and sends inputs 3, 4, and 5 that are cached to memory, to the backend server system to be processed and these inputs are removed from memory. The computing device continues caching input values and sending them after the predefined time in this manner.

Returning to FIG. 3, in operation 306, the computing device receives an updated data set from the backend server system. For example, the backend server system uses the cached values received from the computing device to update the data set stored in one or more databases at the backend server system. The backend server system returns the full data set (e.g., all the data) for the table to the computing device. The computing device then determines what further processing needs to be done and what data should be rendered in the user interface.

In operation 308, the computing device determines a visible set of data in the user interface. For example, the computing device can determine which columns and rows, or just which rows, are visible in the user interface. In the example user table 402, the computing device would determine that the first row of the table through the row 410 is visible in the user interface. Instead of processing the result set received from the backend server system as a whole, the computing device only processes to the row tuple which is visible in the rendering area (e.g., the user interface). A row tuple is a data structure that comprises all of the data for a particular row (e.g., dispersed across several columns), such as row 412 shown in FIG. 4. In one example, only the y axis (e.g., column) is processed in the manner described herein (e.g., partially) and the x axis (e.g., row) is processed in its entirety. Further, only affected data cells are updated and processed by the computing device.

In operation 310, the computing device processes, based on the updated data set from the backend server system, each row tuple in the visible set of data in the user interface to generate updated row tuples. The row tuple comprises multiple tuple elements where each tuple element is a value in the row. The backend server system returns a complete result set of data for the table, which is a huge set of data, but the computing device only processes what has been changed in the visible set of data in the user interface. For instance, the computing device moves through the result set to check if a cell has been updated, and if so, only processes the updated data cell and renders the corresponding data cells. In one example, row and column information can be ignored. This greatly reduces the load on the computing device and improves performance.

The computing device processes each row tuple in the visible set of data in the user interface by formatting one or more values and/or performing calculations corresponding to one or more changed values. For example, a user may have set a particular style for the table or data in the table and the computing device determines the style and applies the determined style to the data in each row tuple. Some examples of styles or formats for a cell in a table include a number of currency (e.g., 826 USD or $826), a number with scale (e.g., "12.5 million"), a "total" cell with contains the total (sum) of a row or column, and so forth.

In another example, additional information may need to be added and additional calculations performed that are only available on the computing device. The computing device determines what additional information to add, and what additional calculations to add and adds the additional information to each row tuple and performs the additional calculations and adds the results to each row tuple, as appropriate. For instance, the computing device determines which values or data cells have been changed and which data cells reference the data cells that have been changed. The computing device updates the data cells that reference the data cells that have been changed, using the updated data set received from the backend server system.

For example, a user may input a new value for column A and column C is a total of column A and column B. Column C only exists in the table on the computing device, and thus, is not in the result set received from the backend server system after processing the cached values. Accordingly, the computing device calculates the new total for column C based on the new value for column A and the existing value for column C using the updated data set received from the backend server system. As another example, a running calculation, such as an accumulative sum formula, can be used which references one or more previous values. In the example cells below, if a value of a first cell is changed to 22.00 in the updated data set received from the backend server system, as shown in the first cell under "May (2023)," then the computing device calculates a new value for each value in the "Accumulative Sum" column (e.g., 249.22, 438.90 and 454.45). Other examples of running sum calculations include count, rank, Olympic rank, and the like.

| May (2023) | Accumulative Sum |
|---|---|
| 22.00 | 249.22 |
| 189.67 | 438.90 |
| 15.55 | 454.45 |

In one example, a data structure is generated and maintained on the computing device that comprises the relationships between values (e.g., cells) and which values need to be calculated after receiving a result set from a backend sever system. The computing device refers to the data structure to determine which values in a row tuple need additional information or calculations.

In this way, by formatting and doing further additions and calculations, the processing of each row tuple in the visible set of data prepares the data for rendering in the user interface.

In operation 312, the computing device determines one or more data cell that has been changed in the visible set of data corresponding to the updated row tuples. In this operation, the computing device determines what will need to be rendered in the user interface. For example, if only one value in one data cell has been changed but five values in five data cells in total are affected by the change to the one data cell, the computing device determines that it only needs to render the five data cells.

In operation 314, the computing device renders, in the user interface, only the one or more data cell that has been changed corresponding to the one or more row tuple to update the one or more data cell in the user interface displayed on the computing device. In this way, the computing device only need render the affected cells, thus saving processing power and improving performance.

In one example, the computing device displays an indication in a data cell for each value that has been changed (e.g., updated). For instance, the computing system could cause the data cell for each value to be highlighted in a certain color (e.g., blue); cause the font of the value in the data cell to change in size, format, or color; or cause another indication. In one example, the indication for a data cell that has been sent for processing at the backend server system is a different indication (e.g., different color) than the indication that a value has been changed. Display of the indication(s) provide direct feedback to the user.

The computing device can determine when there is a change in the visible set of data in the user interface, such as when a user scrolls up or down through the user interface. For instance, the computing device continually receives an updated cursor position, and once it detects that a new row or rows are visible in the user interface it can determine one or more row tuples that were not previously visible in the user interface. Based on detecting the change in the visible set of data in the user interface, the computing device processes, based on the updated data set from the backend server system, the one or more row tuples that were not previously visible in the user interface to generate an updated one or more row tuples for these row tuples that were not previously visible. The computing device determines one or more data cell that has changed in the visible set of data corresponding to the updated one or more row tuples for these row tuples that were not previously visible and renders, in the user interface, only the one or more data cell that has changed to update the user interface displayed on the computing device, as explained in further detail previously. In one example, the computing device maintains an index with what data cells have already been processed so that it knows to what point data cells have been processed. Since the computing device need only updated what is newly visible in the user interface, computing resources are reduced, and performance is improved. In this way the data can be processed on the fly in real time (or near real time) as the user enters or updates data and scrolls up or down to reveal more visible data.

In one example, the computing device detects a change in layout of data cells in the user interface. For example, the change in layout may be an addition of a new column or new row, or a deletion of an existing column or existing row. Based on detecting the change in layout, the computing device refreshes all of the data cells.

In view of the above disclosure, various examples are set forth below. It should be noted that one or more features of an example, taken in isolation or combination, should be considered within the disclosure of this application.

Example 1. A method comprising:
 detecting, by a computing device, input in a data cell on a user interface displayed on the computing device;
 caching, by the computing device, a value of the input in memory;
 based on determining that a predefined period of time has passed since one or more values cached in the memory have been sent to a backend server system to be processed, sending, by the computing device, the value and any other values cached in the memory to the backend server system to be processed;
 removing, by the computing device, the value and any other values cached in the memory;
 receiving, by the computing device, an updated data set from the backend server system;
 determining a visible set of data in the user interface;
 processing, based on the updated data set from the backend server system, each row tuple in the visible set of data in the user interface to generate updated row tuples;
 determining one or more data cell that has been changed in the visible set of data corresponding to the updated row tuples; and
 rendering, in the user interface, only the one or more data cell that has been changed corresponding to updated row tuples to update the one or more data cell in the user interface displayed on the computing device.

Example 2. A method according to any of the previous examples, wherein each row tuple in the visible set of data is a first set of row tuples, and further comprising:
 detecting a change in the visible set of data in the user interface that comprises a second one or more row tuple that was not previously visible in the user interface;
 processing, based on the updated data set from the backend server system, the second one or more row tuple that was not previously visible in the user interface to generate an updated second one or more row tuple;
 determining one or more data cell that has been changed in the visible set of data corresponding to the updated second one or more row tuple; and
 rendering, in the user interface, only the one or more data cell that has been changed in the second one or more row tuple to update the user interface displayed on the computing device.

Example 3. A method according to any of the previous examples, further comprising:
 displaying a first indication in a data cell for each the value and any other values cached in the memory that the value and any other values have been sent to the backend server system to be processed.

Example 4. A method according to any of the previous examples, further comprising:
 displaying a second indication in a data cell for each of the one or more data cell that has been changed.

Example 5. A method according to any of the previous examples, wherein the first indication is a first color and the second indication is a second color.

Example 6. A method according to any of the previous examples, wherein processing, based on the updated data set from the backend server system, each row tuple in the visible set of data in the user interface to generate updated row tuples comprises at least one of formatting one or more value or performing calculations corresponding to one or more changed value.

Example 7. A method according to any of the previous examples, wherein processing, based on the updated data set from the backend server system, each row tuple in the visible set of data in the user interface to generate updated row tuples comprises determining which data cells have been changed and which data cells reference the data cells that have been changed.

Example 8. A method according to any of the previous examples, further comprising:
 updating the data cells that reference the data cells that have been changed, based on the updated data set received from the backend server system.

Example 9. A method according to any of the previous examples, further comprising:
 detecting a change in layout of data cells in the user interface; and refreshing all of the data cells based on the detected change in layout.

Example 10. A method according to any of the previous examples, wherein the detected change in layout comprises an addition of a new column or new row or deletion of an existing column or existing row.

Example 11. A computing device comprising:
 a memory that stores instructions; and
 one or more processors configured by the instructions to perform operations comprising:
  detecting input in a data cell on a user interface displayed on the computing device;
  caching a value of the input in memory;
  based on determining that a predefined period of time has passed since one or more values cached in the memory have been sent to a backend server system to be processed, sending the value and any other values cached in the memory to the backend server system to be processed;
  removing the value and any other values cached in the memory;
  receiving an updated data set from the backend server system;
  determining a visible set of data in the user interface;
  processing, based on the updated data set from the backend server system, each row tuple in the visible set of data in the user interface to generate updated row tuples;
  determining one or more data cell that has been changed in the visible set of data corresponding to the updated row tuples; and
  rendering, in the user interface, only the one or more data cell that has been changed corresponding to updated row tuples to update the one or more data cell in the user interface displayed on the computing device.

Example 12. A computing device according to any of the previous examples, wherein each row tuple in the visible set of data is a first set of row tuples, and the operations further comprise:
 detecting a change in the visible set of data in the user interface that comprises a second one or more row tuple that was not previously visible in the user interface;
 processing, based on the updated data set from the backend server system, the second one or more row tuple that was not previously visible in the user interface to generate an updated second one or more row tuple;
 determining one or more data cell that has been changed in the visible set of data corresponding to the updated second one or more row tuple; and
 rendering, in the user interface, only the one or more data cell that has been changed in the second one or more row tuple to update the user interface displayed on the computing device.

Example 13. A computing device according to any of the previous examples, the operations further comprising:
 displaying a first indication in a data cell for each the value and any other values cached in the memory that the value and any other values have been sent to the backend server system to be processed.

Example 14. A computing device according to any of the previous examples, further comprising:
 displaying a second indication in a data cell for each of the one or more data cell that has been changed.

Example 15. A computing device according to any of the previous examples, wherein the first indication is a first color and the second indication is a second color.

Example 16. A computing device according to any of the previous examples, wherein processing, based on the updated data set from the backend server system, each row tuple in the visible set of data in the user interface to generate updated row tuples comprises at least one of formatting one or more value or performing calculations corresponding to one or more changed value.

Example 17. A computing device according to any of the previous examples, wherein processing, based on the updated data set from the backend server system, each row tuple in the visible set of data in the user interface to generate updated row tuples comprises determining which data cells have been changed and which data cells reference the data cells that have been changed.

Example 18. A computing device according to any of the previous examples, the operations further comprising:
 updating the data cells that reference the data cells that have been changed, based on the updated data set received from the backend server system.

Example 19. A computing device according to any of the previous examples, the operations further comprising:
 detecting a change in layout of data cells in the user interface; and
 refreshing all of the data cells based on the detected change in layout.

Example 20. A non-transitory computer-readable medium comprising instructions stored thereon that are executable by at least one processor to cause a computing device to perform operations comprising:
 detecting input in a data cell on a user interface displayed on the computing device;
 caching a value of the input in memory;
 based on determining that a predefined period of time has passed since one or more values cached in the memory have been sent to a backend server system to be processed, sending the value and any other values cached in the memory to the backend server system to be processed;
 removing the value and any other values cached in the memory;
 receiving an updated data set from the backend server system;
 determining a visible set of data in the user interface;
 processing, based on the updated data set from the backend server system, each row tuple in the visible set of data in the user interface to generate updated row tuples;
 determining one or more data cell that has been changed in the visible set of data corresponding to the updated row tuples; and
 rendering, in the user interface, only the one or more data cell that has been changed corresponding to updated row tuples to update the one or more data cell in the user interface displayed on the computing device.

Figure 6:
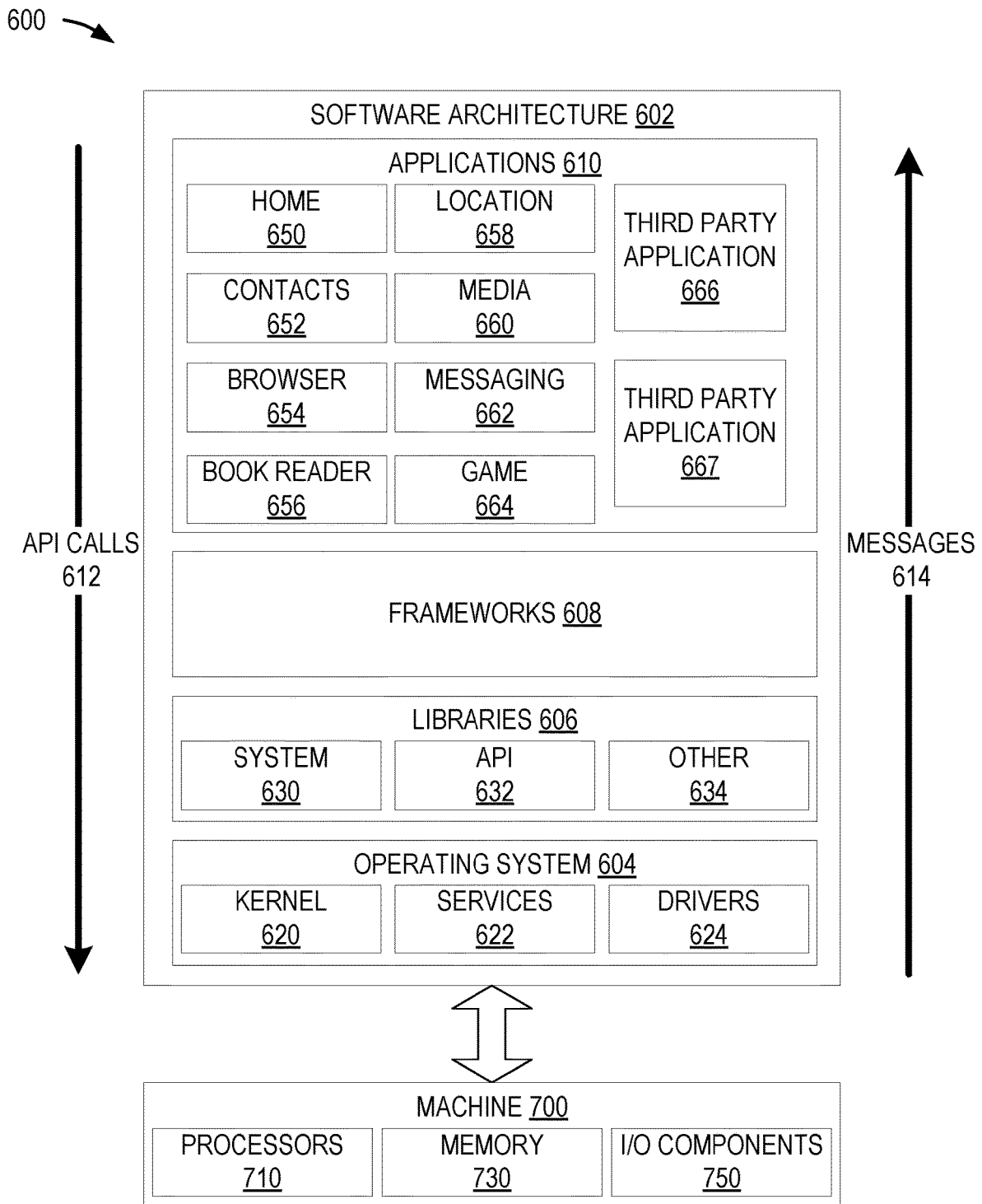
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110 and servers and systems 130, 102, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and input/output (I/O) components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as third-party applications 666 and 667. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
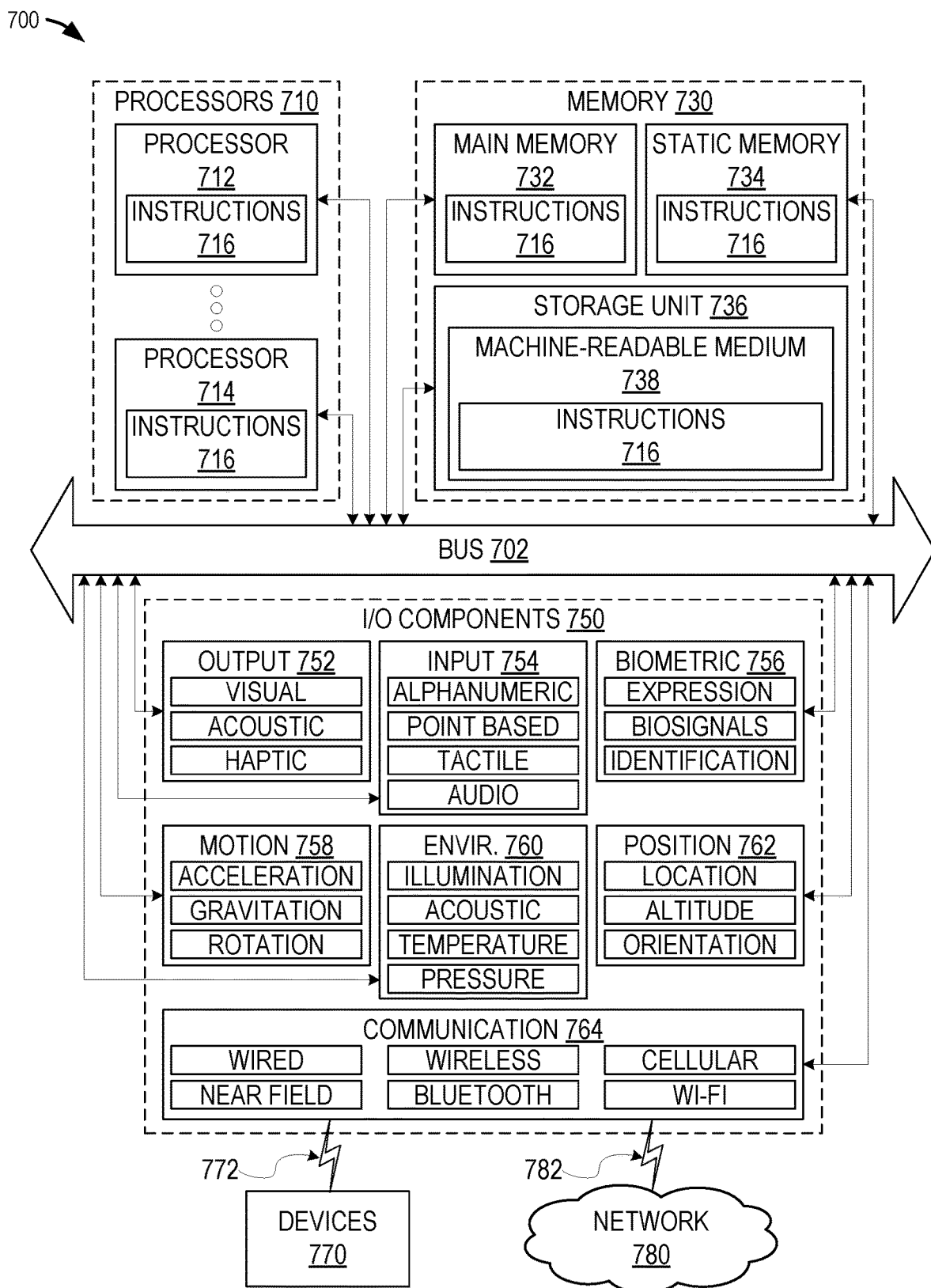
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or system 130, 102, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the machine-readable medium 738 should be considered as being transportable from one physical location to another. Additionally, since the machine-readable medium 738 is tangible, the machine-readable medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   detecting, by a computing device, input of a value in a data cell on a user interface displayed on the computing device, the user interface displaying representations of data stored on a backend system;
   caching, by the computing device, the value of the input in memory of the computing device with other values previously cached in the memory of the computing device;
   evaluating a time interval between the input of the value in the data cell and a status of processing previous batches of changes;
   based on determining that the time interval indicates that a predefined period of time has passed since one or more values cached in the memory of the computing device have been sent to a backend server system to be processed, sending, by the computing device, the value and the other values previously cached in the memory of the computing device to the backend server system to be processed;

removing from the memory of the computing device, by the computing device, the value and the other values cached in the memory that were sent to the backend system to be processed;

receiving, by the computing device from the backend server system, an updated data set for the representations of data stored on the backend server system;

determining, by the computing device, a visible set of data in the user interface of the computing device, the visible set of data comprising a portion of the data stored on the backend system and corresponding to a subset of the updated data set received from the backend server system;

processing, by the computing device, each row tuple in the visible set of data in the user interface to generate updated row tuples based on the subset of the updated data set received from the backend server system that corresponds to the visible set of data;

determining, by the computing device, one or more data cell that has been changed in the visible set of data corresponding to the updated row tuples; and rendering, by the computing device in the user interface, only the one or more data cell that has been changed corresponding to the updated row tuples to update the one or more data cell in the user interface displayed on the computing device.

2. The method of claim 1, wherein each row tuple in the visible set of data is a first set of row tuples, and further comprising:

detecting a change in the visible set of data in the user interface that comprises a second one or more row tuple that was not previously visible in the user interface;

processing, based on the updated data set received from the backend server system, the second one or more row tuple that was not previously visible in the user interface to generate an updated second one or more row tuple;

determining one or more data cell that has been changed in the visible set of data corresponding to the updated second one or more row tuple; and rendering, in the user interface, only the one or more data cell that has been changed in the second one or more row tuple to update the user interface displayed on the computing device.

3. The method of claim 1, further comprising:
displaying a first indication in a data cell for each of the value and any other values cached in the memory that the value and any other values have been sent to the backend server system to be processed.

4. The method of claim 3, further comprising:
displaying a second indication in a data cell for each of the one or more data cell that has been changed.

5. The method of claim 4, wherein the first indication is a first color and the second indication is a second color.

6. The method of claim 1, wherein processing each row tuple in the visible set of data in the user interface to generate updated row tuples based on the subset of the updated data set received rom the backend server system that corresponds to the visible set of data comprises at least one of formatting one or more value or performing calculations corresponding to one or more changed value.

7. The method of claim 1, each row tuple in the visible set of data in the user interface to generate updated row tuples based on the subset of the updated data set received rom the backend server system that corresponds to the visible set of data comprises determining which data cells have been changed and which data cells reference the data cells that have been changed.

8. The method of claim 7, further comprising:
updating the data cells that reference the data cells that have been changed, based on the updated data set received from the backend server system.

9. The method of claim 1, further comprising:
detecting a change in a layout of data cells in the user interface; and
refreshing all of the data cells based on the detected change in the layout.

10. The method of claim 1, wherein the detected change in layout comprises an addition of a new column or new row or deletion of an existing column or existing row.

11. A computing device comprising:
a memory that stores instructions; and
one or more processors configured by the instructions to perform operations comprising:
detecting input of a value in a data cell on a user interface displayed on the computing device, the user interface displaying representations of data stored on a backend system;
caching the value of the input in memory of the computing device with other values previously cached in the memory of the computing device;
evaluating a time interval between the input of the value in the data cell and a status of processing previous batches of changes;
based on determining that the time interval indicates that a predefined period of time has passed since one or more values cached in the memory of the computing device have been sent to a backend server system to be processed, sending the value and the other values previously cached in the memory of the computing device to the backend server system to be processed;
removing from the memory of the computing device, the value and the other values cached in the memory that were sent to the backend system to be processed;
receiving, from the backend server system, an updated data set for the representations of data stored on the backend server system;
determining a visible set of data in the user interface of the computing device, the visible set of data comprising a portion of the data stored on the backend system and corresponding to a subset of the updated data set received from the backend server system;
processing, each row tuple in the visible set of data in the user interface to generate updated row tuples based on the subset of the updated data set received from the backend server system that corresponds to the visible set of data;
determining one or more data cell that has been changed in the visible set of data corresponding to the updated row tuples; and
rendering in the user interface, only the one or more data cell that has been changed corresponding to the updated row tuples to update the one or more data cell in the user interface displayed on the computing device.

12. The computing device of claim 11, wherein each row tuple in the visible set of data is a first set of row tuples, and the operations further comprise:
detecting a change in the visible set of data in the user interface that comprises a second one or more row tuple that was not previously visible in the user interface;

processing, based on the updated data set received from the backend server system, the second one or more row tuple that was not previously visible in the user interface to generate an updated second one or more row tuple;

determining one or more data cell that has been changed in the visible set of data corresponding to the updated second one or more row tuple; and rendering, in the user interface, only the one or more data cell that has been changed in the second one or more row tuple to update the user interface displayed on the computing device.

13. The computing device of claim 11, the operations further comprising:

displaying a first indication in a data cell for each the value and any other values cached in the memory that the value and any other values have been sent to the backend server system to be processed.

14. The computing device of claim 13, further comprising:

displaying a second indication in a data cell for each of the one or more data cell that has been changed.

15. The computing device of claim 14, wherein the first indication is a first color and the second indication is a second color.

16. The computing device of claim 11 each row tuple in the visible set of data in the user interface to generate updated row tuples based on the subset of the updated data set received rom the backend server system that corresponds to the visible set of data comprises at least one of formatting one or more value or performing calculations corresponding to one or more changed value.

17. The computing device of claim 11 each row tuple in the visible set of data in the user interface to generate updated row tuples based on the subset of the updated data set received rom the backend server system that corresponds to the visible set of data comprises determining which data cells have been changed and which data cells reference the data cells that have been changed.

18. The computing device of claim 17, the operations further comprising:

updating the data cells that reference the data cells that have been changed, based on the updated data set received from the backend server system.

19. The computing device of claim 11, the operations further comprising:

detecting a change in layout of data cells in the user interface; and refreshing all of the data cells based on the detected change in layout.

20. A non-transitory computer-readable medium comprising instructions stored thereon that are executable by at least one processor to cause a computing device to perform operations comprising:

detecting input of a value in a data cell on a user interface displayed on the computing device, the user interface displaying representations of data stored on a backend system;

caching the value of the input in memory of the computing device with other values previously cached in the memory of the computing device;

evaluating a time interval between the input of the value in the data cell and a status of processing previous batches of changes;

based on determining that the time interval indicates that a predefined period of time has passed since one or more values cached in the memory of the computing device have been sent to a backend server system to be processed, sending the value and the other values previously cached in the memory of the computing device to the backend server system to be processed;

removing from the memory of the computing device, the value and the other values cached in the memory that were sent to the backend system to be processed;

receiving, from the backend server system, an updated data set for the representations of data stored on the backend server system;

determining a visible set of data in the user interface of the computing device, the visible set of data comprising a portion of the data stored on the backend system and corresponding to a subset of the updated data set received from the backend server system;

processing, each row tuple in the visible set of data in the user interface to generate updated row tuples based on the subset of the updated data set received from the backend server system that corresponds to the visible set of data;

determining one or more data cell that has been changed in the visible set of data corresponding to the updated row tuples; and rendering in the user interface, only the one or more data cell that has been changed corresponding to the updated row tuples to update the one or more data cell in the user interface displayed on the computing device.

* * * * *